Feb. 24, 1948.        A. J. CLEGG        2,436,630
SEDIMENT TRAP FOR STREAMS
Filed Jan. 24, 1946        2 Sheets-Sheet 1
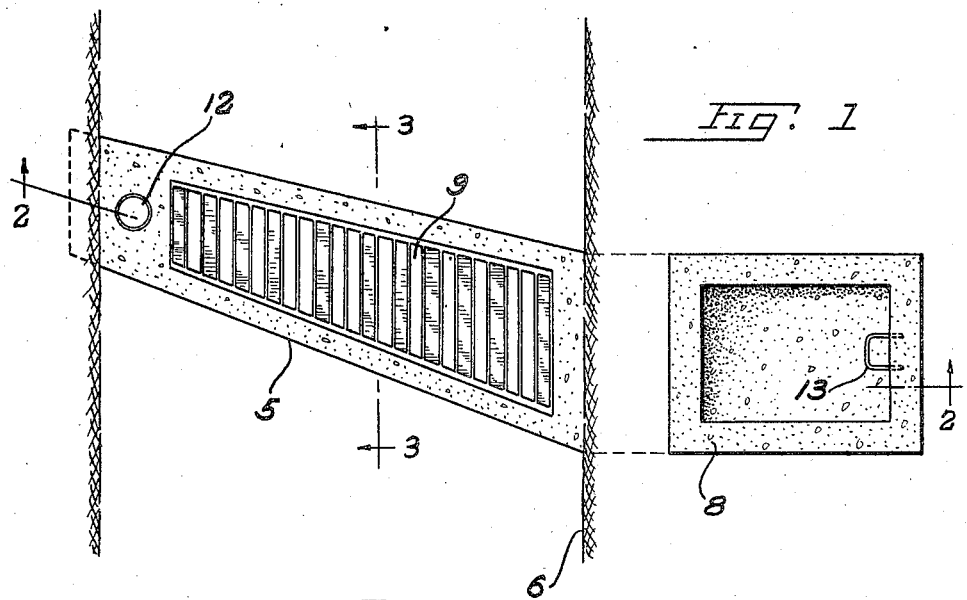
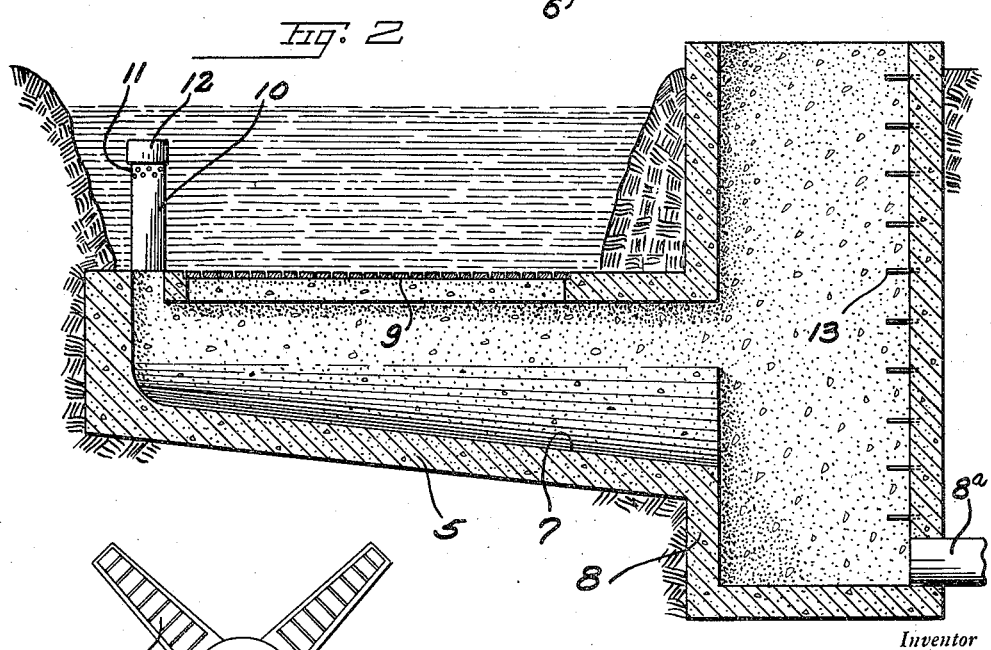
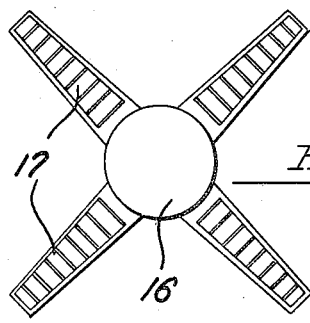
Inventor
ANDREW J. CLEGG
By Clarence A. O'Brien
and Harvey B. Jacobson
Attorneys

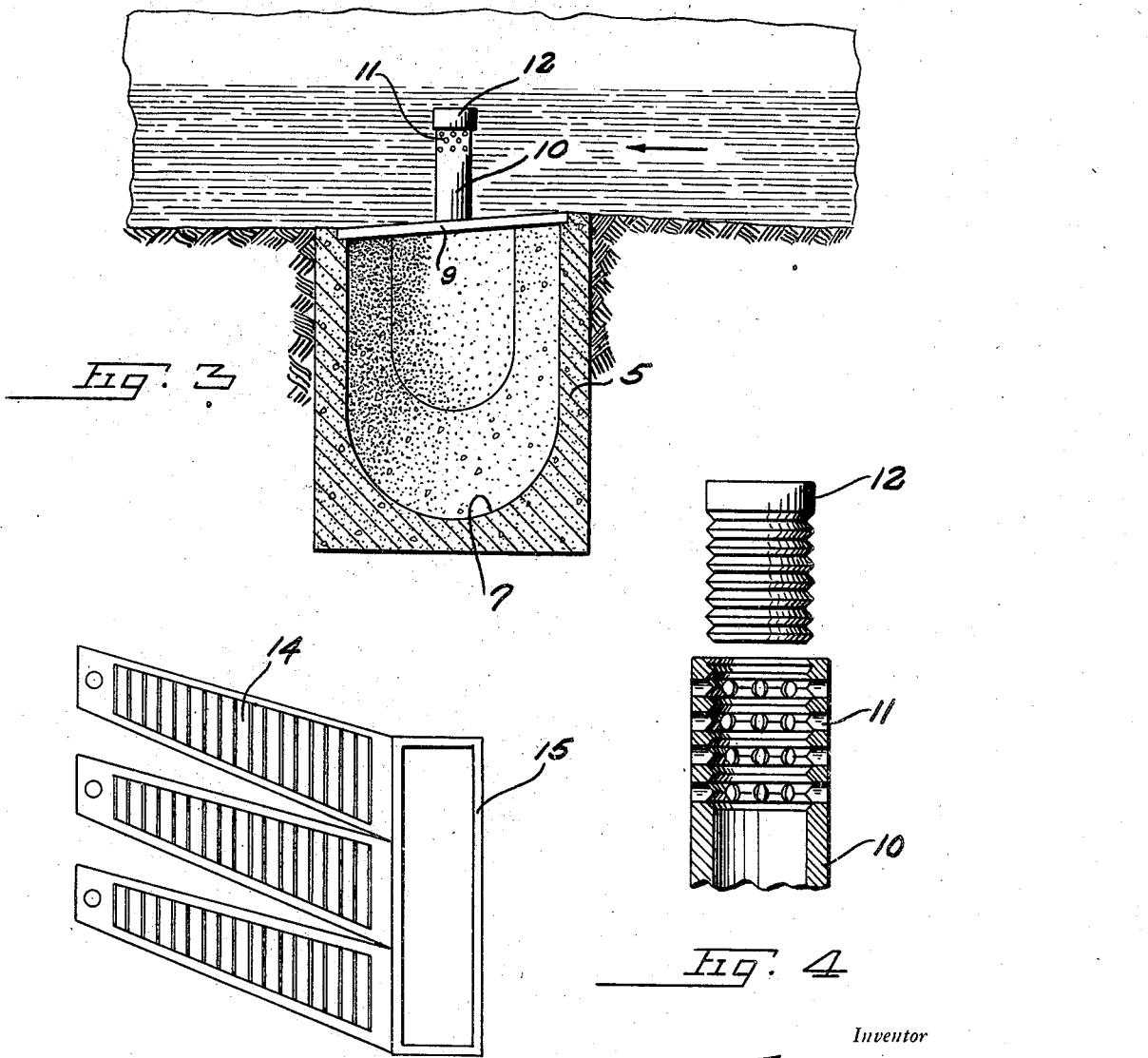

Patented Feb. 24, 1948

2,436,630

UNITED STATES PATENT OFFICE 2,436,630

SEDIMENT TRAP FOR STREAMS

Andrew J. Clegg, Santa Rosa, Calif.

Application January 24, 1946, Serial No. 643,176

2 Claims. (Cl. 61—2)

The present invention relates to new and useful improvements in sediment traps and more particularly to traps of this character adapted for placing in the bed of a moving stream or other body of water to capture and reclaim solid materials carried along the stream by the water.

An important object of the present invention is to provide a trap of this character by means of which organic or inorganic matter, or a combination thereof, such as silt, soil gravel, sand, minerals or ores may be recovered from the stream without interfering with the normal flow of water therein.

A further object of the invention is to provide a device of this character of simple and practical construction, which is efficient and reliable in operation, relatively inexpensive to install in operative position and which otherwise is well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a top plan view.

Figure 2 is a transverse sectional view taken substantially on a line 2—2 of Figure 1.

Figure 3 is a sectional view taken on a line 3—3 of Figure 1.

Figure 4 is an enlarged sectional view of one form of a flushing pipe.

Figure 5 is a plan view illustrating one arrangement of a group of trap units, and Figure 6 is a simpler view of a modified arrangement of the trap unit.

Referring now to the drawings in detail wherein for the purpose of illustration I have disclosed a preferred embodiment of the invention. The numeral 5 designates a generally trough-shaped trap member, preferably constructed of concrete and positioned at an inclined angle in the bed of a stream 6 and below the surface of the water thereof.

The trap member 5 is preferably of tapering construction with its wider portion at its downstream end, the tapering construction also including a sloping bottom 7 communicating with the sediment collecting chamber 8 in one side of the latter and above the bottom thereof.

The sediment chamber 8 is likewise preferably constructed of concrete and embedded in the bank of the stream with the top of the sediment chamber terminating above the level of the water in the stream.

The top of the trap member 5 is closed by a plurality of slats 9 arranged in slightly spaced apart parallel relation with respect to each other and extending in a direction longitudinally of the direction of travel of the water in the stream.

The upstream edge of the trough-like trap member 5 is elevated above the downstream edge thereof and shown to advantage in Figure 3 of the drawings so that the slats 9 are inclined downwardly in a downstream direction.

A flush pipe 10 rises from the end of the trap member 5 opposite from the sediment chamber 8 and terminates below the level of the water in the stream. The upper portion of the pipe 10 is perforated or formed with openings 11 and adapted to be closed by a cap 12 threadedly connected to the upper end of the pipe to regulate the volume of water entering the pipe for flushing the trap member 5.

Accordingly in the operation of the device and by placing the trap member 5 in the manner as illustrated in Figures 1 to 3 inclusive, of the drawings the silt, soil, sand or relatively fine ore while being carried along the bed of the stream or suspended in the lower portion thereof, will enter the openings between the slats 9 and settle into the inclined trap member 5. Water entering the flush pipe 10 through the openings 11 will wash the sediment along the sloping bottom 7 of the trap member 5 into the sediment collecting chamber 8 where the same is trapped therein.

The accumulation of sediment collected in the chamber 8 may be removed in any suitable manner such as by a pipe or conduit 8a of sufficient size to carry the trapped water and sediment away from the collecting chamber, said pipe or conduit being attached to and entering the bottom of the chamber 8 and extending therefrom at a desired angle. Where the terrain is not suitable for the installation of the pipe or conduit 8a, a pump (not shown) may be used and mounted on top of the chamber 8.

The chamber 8 is also provided with steps or ladder rungs 13 to permit a workman to enter the chamber for repair or other purposes when the level of the water in the stream permits.

In Figures 5 and 6 of the drawings I have illustrated modified forms of arranging a group of trap units, Figure 5 illustrating a plurality of the trap units 14 adapted for positioning substantially transversely of the bed of a stream and communicating with one side of a sediment collecting chamber 15.

In Figure 6 of the drawing the sediment collecting chamber is designated at 16 and is designed for placing in the center of a stream and provided with a plurality of trap units 17 extending radially therefrom. This form of the invention is intended for use in streams in which the current flows at the center thereof while the rate of flow at the sides of the stream is considerably less.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

I claim:

1. A sediment trap for flowing bodies of water and comprising an elongated trough-like trap member positioned in the water below its surface, and having a bottom sloping longitudinally of said member, a cover for the trap member having openings therein to admit material traveling with the water and sloping transversely of said member, a sediment collecting chamber at the lower end of the trap member, and a flush pipe extending upwardly from the trap member at its other end adapted to admit water into the trap member for flushing loose material therein into the collecting chamber.

2. A sediment trap for flowing bodies of water and comprising an elongated trough-like trap member positioned in the water below its surface, and having a sloping bottom, a cover for the trap member having openings therein to admit material traveling with the water, a sediment collecting chamber at the lower end of the trap member, a flush pipe extending upwardly from the trap member at its other end and having intake openings adjacent its top, and a cap adjustably mounted on the pipe for regulating the admission of water through said openings, said cover comprising spaced apart slats sloping endwise transversely of said member.

ANDREW J. CLEGG.

REFERENCES CITED

The following references are of record in the file of this patent:

UNITED STATES PATENTS

| Number | Name | Date |
| --- | --- | --- |
| 1,351,979 | Valentin | Sept. 7, 1920 |
| 1,388,040 | Hood | Aug. 16, 1921 |
| 1,865,322 | Latimer | June 28, 1932 |